3 Sheets—Sheet 1.
J. C. DUCKWORTH.
Assignor, by mesne assignments, to G. CROMPTON.
Loom.
No. 9,270. Reissued June 29, 1880.
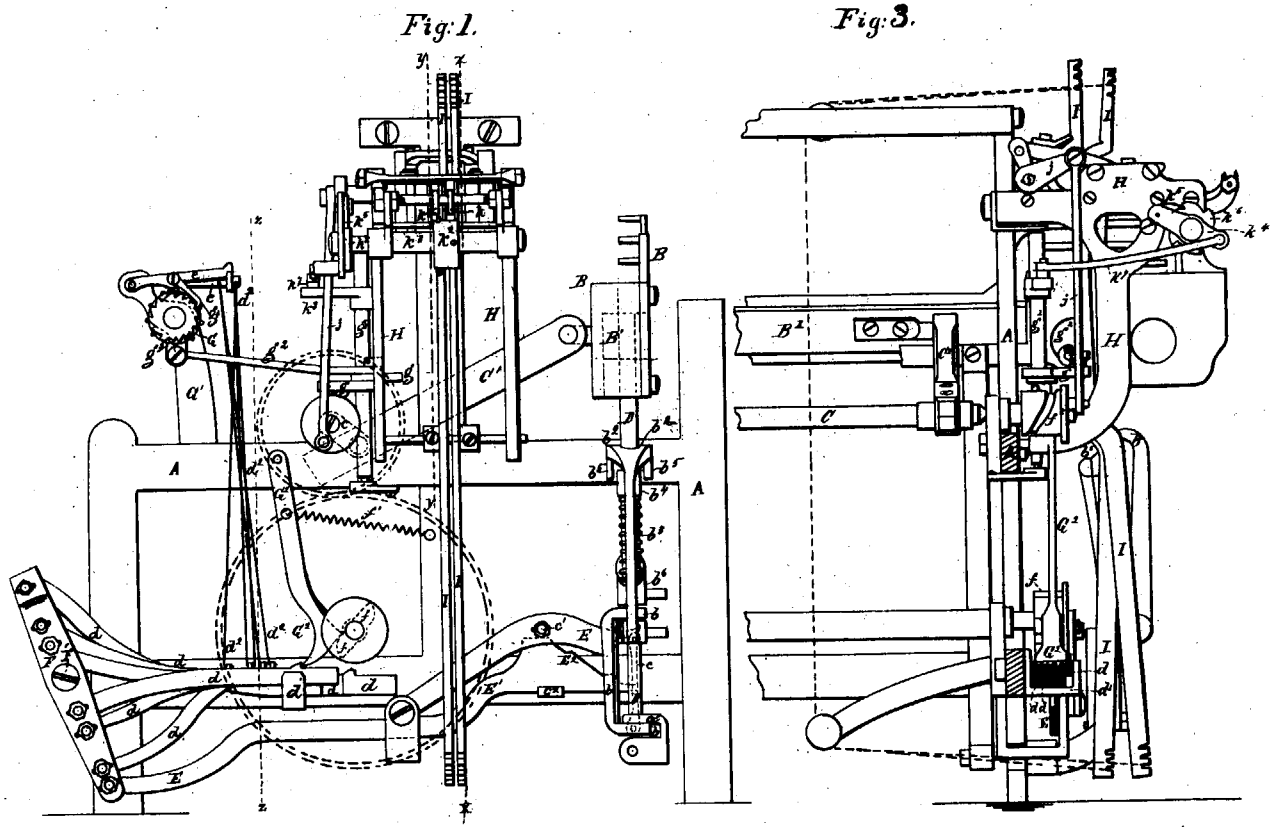
Witnesses.
L. H. Latimer
W. J. Pratt.
Inventor.
John C. Duckworth
Assr. to George Crompton
per Crosby & Gregory Att'ys.
N. PETERS, PHOTO-LITHOGRAPHER, WASHINGTON, D. C.

J. C. DUCKWORTH,
Assignor, by mesne assignments, to G. CROMPTON.
Loom.
No. 9,270. Reissued June 29, 1880.
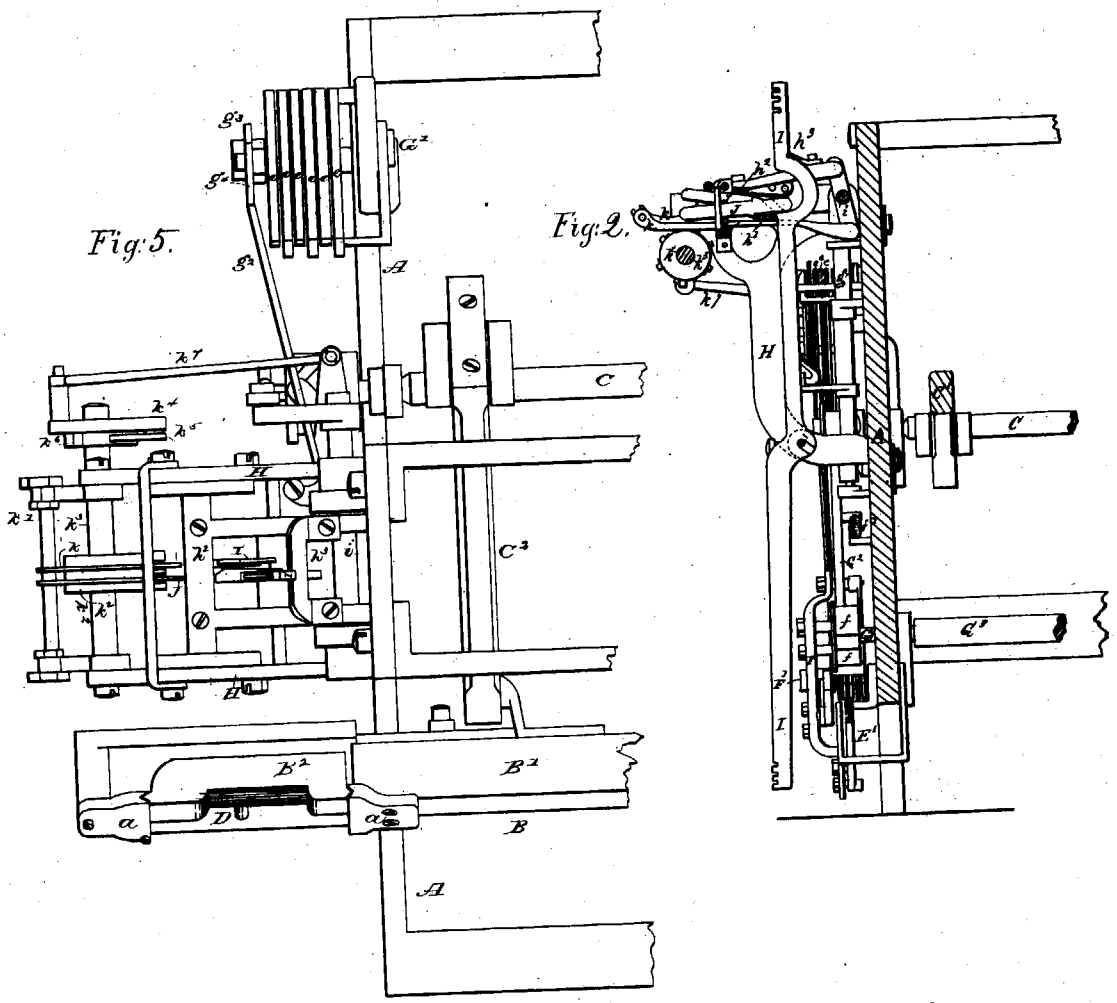
Witnesses.
E. H. Gatimer.
H. J. Pratt.
Inventor
John C. Duckworth
Assor to George Crompton
per Crosby & Gregory
Attys.
N. PETERS, PHOTO-LITHOGRAPHER, WASHINGTON, D. C.

J. C. DUCKWORTH,

Assignor, by mesne assignments, to G. CROMPTON.

Loom.

No. 9,270. Reissued June 29, 1880.

Witnesses.

L. H. Latimer

W. G. Pratt.

Inventor.

John C. Duckworth
Assor. to Geo. Crompton
per Crosby & Gregory
Attys.

N. PETERS, PHOTO-LITHOGRAPHER, WASHINGTON, D. C.

UNITED STATES PATENT OFFICE.

JOHN C. DUCKWORTH, OF NEW YORK, N. Y., ASSIGNOR, BY MESNE ASSIGNMENTS, TO GEORGE CROMPTON, OF WORCESTER, MASS.

LOOM.

SPECIFICATION forming part of Reissued Letters Patent No. 9,270, dated June 29, 1880.

Original No. 137,898, dated April 15, 1873. Application for reissue filed April 10, 1880.

*To all whom it may concern:*

Be it known that I, JOHN C. DUCKWORTH, of the city, county, and State of New York, formerly of Mount Carmel, in the county of New Haven and State of Connecticut, have invented certain new and useful Improvements in Looms for Weaving Fancy Fabrics; and I do hereby declare that the following is a full, clear, and exact description thereof, reference being had to the accompanying drawings, making a part of this specification, in which—

Figure 6:
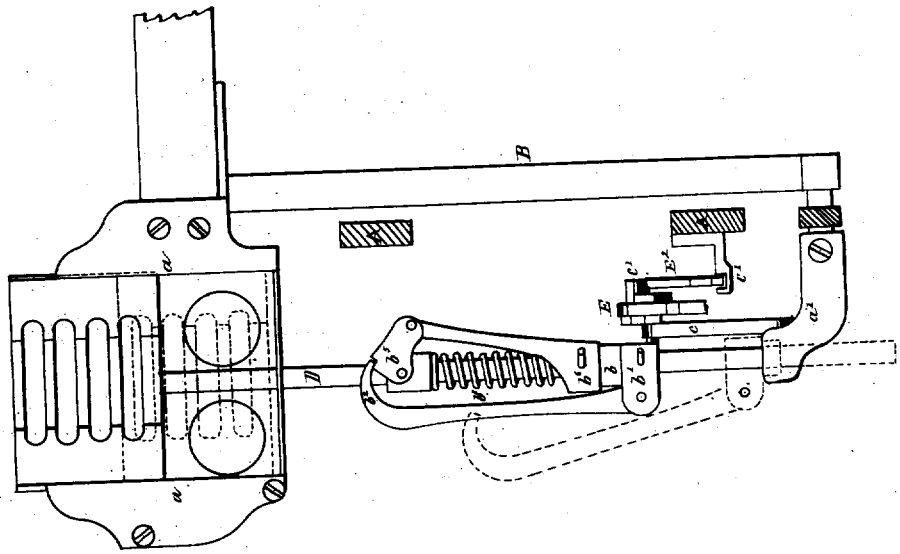
Figure 4:
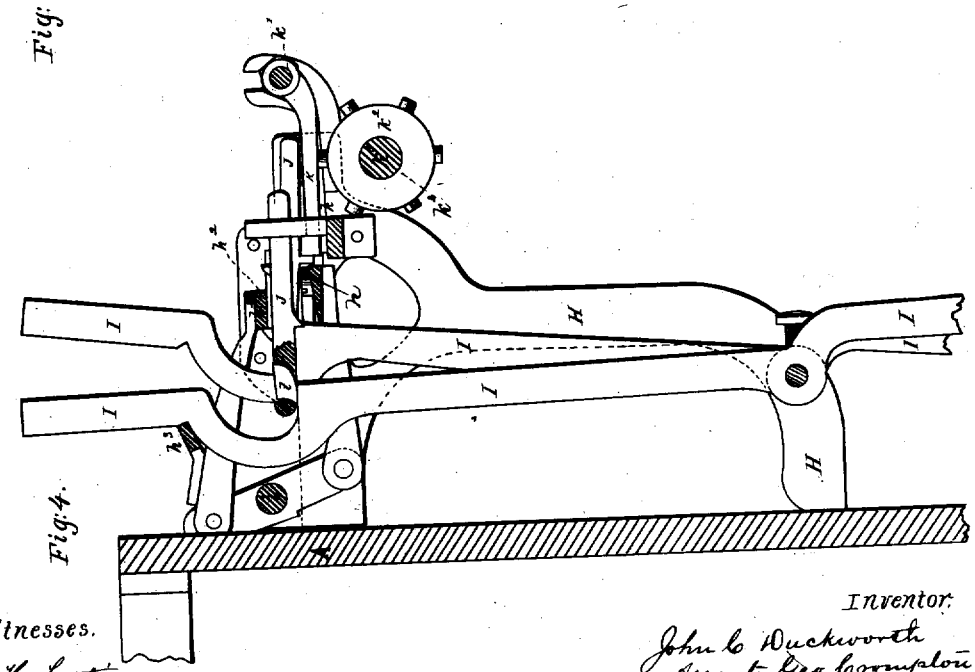

Figure 1 is an elevation of one side of the improved loom. Fig. 2 is a transverse section through one side of the loom, taken in the vertical plane indicated by line *x x* in Fig. 1, and looking toward the rear of the loom. Fig. 3 is a transverse section through the loom, taken in the vertical plane indicated by line *z z* in Fig. 1, and looking toward the front of the loom. Fig. 4 is an enlarged sectional view taken in the vertical plane indicated by line *y y*, Fig. 1. Fig. 5 is a top view of those parts of the loom shown in Fig. 1. Fig. 6 is a front view, showing a device applied to the shuttle-box rod for relieving it should the shuttle-boxes meet with undue resistance in their upward movements.

Similar letters of reference indicate corresponding parts in the several figures.

My said invention consists of several improvements, some of which relate to the mechanism for forming and shifting the shed, commonly called the "harness-motion," and others relate to the mechanism for operating the series of shifting shuttle-boxes, whereby the proper shuttle is selected and brought to its place to be thrown.

Both classes of improvements may be used in the same loom, as shown, or they may be used separately in different looms, the shuttle mechanism being adapted to work in Jacquard looms.

One of my improvements in the mechanism for shifting the shuttle-boxes consists in the combination and arrangement of a spring-latch-releasing mechanism with the vertical rod which supports the shifting shuttle-boxes and the connections which give motion to the rod, in manner substantially as hereinafter more fully described, the arrangement and combination being such that when any obstruction opposes the lifting of the boxes the latch releases the lifting mechanism from its connection with the shuttle-box rod, and thereby prevents breakage.

Another of my improvements in the mechanism for shifting the shuttle-boxes relates to an improved arrangement of certain mechanism for selecting and moving the shuttle-boxes patented by Christopher Duckworth, January 9, 1866; and it consists in so constructing and arranging the double series of hooked jacks attached to the double rocking arm and their connections with the pattern mechanism that the hooked ends of both series of jacks lie horizontally side by side below the end of the pawl, instead of being arranged in separate groups, one series below the end of the pawl and the other series above and passing through the vibrating pawl-arm, as in the said C. Duckworth patent.

By this improved arrangement the interference of the jacks of one series with the connecting-rods from the pattern mechanism to the other series is avoided, and the advantage of having each of the jacks operated by the same pawl moving at the same velocity is also obtained.

My improvements in mechanism for forming and shifting the shed relate to that class of looms in which the heddles are actuated through the intervention of levers, and these levers are moved in the proper directions to form the shed by a lifter and depressor acting upon jacks, the arrangement of these jacks prior to the formation of each shed being governed by a pattern-chain.

Many forms and arrangements of such parts were known prior to the date of my invention. For instance, in the loom of Greenhalgh, as patented November 2, 1852, the levers were long upright levers provided with a series of notches at each end thereof, so that the heddle-cords might be secured in any notch, whereby the range of motion of the heddles might be altered without altering the range of motion of the levers; and this loom had a long cog-wheel, which acted both as a lifter and a depressor, and racked jacks and toes or fingers, which communicated the motion they derived from the pattern apparatus to the jacks. In this loom the same piece of metal acted both as lifter and depressor, and was located between the two racks which were formed on each of the jacks.

Subsequent to the Greenhalgh, the loom of Thomas was patented July 3, 1855, and in this loom the lifter and depressor were separate pieces of metal, and located one on each side of hooked jacks; but these latter were each connected to the levers by a rack, a cog-segment, and a slot and a pin, and the jacks were upright, in consequence of which position it was necessary to apply to each jack a weighted bent lever to force it to follow the motions of the fingers. The loom was therefore complex and costly.

The loom of Crompton, patented January 9, 1866, had also levers with notched ends, hooked jacks, a lifter and a depressor, (separate pieces of metal,) a pattern apparatus, and toes or lifters; but in this loom the jacks were hooked on the tops only, and extended on both sides of the levers, and were not located between the lifters and depressors.

Before Crompton a loom was patented by Knowles, February 24, 1863, in which the jacks had the form of cog-wheels and were located between the lifter and depressor, which were separate pieces of metal, (long cog-wheels;) but the jacks were so located with reference to the pattern apparatus and the lifter and depressor that the tension of the heddle-cords, instead of the force of gravity, moved the racks in one direction. This loom, moreover, had no levers of any kind, and the motion was communicated to the heddles by wires connected with the jacks.

Prior to the date of my invention, also, levers of various forms, connected either by wires alone with the heddles, or through the intervention of other levers, were well known.

To sum up, various forms and arrangements of lifters, depressors, jacks, and levers were known prior to my invention; also, various combinations and arrangements of such parts of a loom; and I wish it distinctly understood that I lay no claim to the form or construction of such parts, nor to their combination, except when combined and arranged as hereinafter specified.

In my loom the levers are represented at I I as pivoted upon a frame, H, extending out from the side of the loom, and these levers are notched at their extremities, so that the heddle-cords may be attached at various distances from the pivots of the levers, so that the heddles may at pleasure be moved through different distances while the levers vibrate through the same distance. To each of these levers is attached, by a pivot, a jack, J, and these jacks lie in such manner that they are moved upward by the operation of the pattern-barrel, acting through the toes or fingers K, pivoted at $k'$, and fall by gravity when the fingers permit them to do so. The jacks are each provided with a hook, both on their upper and lower sides, and there are as many jacks and fingers as there are levers. The pattern-barrel or studded cylinder $k^2$ underlies the fingers, and as it revolves raises some of the fingers, and consequently some of the jacks, and permits others to fall by gravity in accordance with the arrangement of the studs on the barrel. Instead of this studded cylinder, a pattern-chain or other known substitute for the cylinder may be employed.

The lifter and depressor are separate pieces of metal, and embrace the jacks between them. They are shown at $h'$ $h^2$ as working in guides upon the frame H, and secured upon the ends of links, which are pivoted to the arms of a rock-shaft, $i$, which receives motion from a crank-pin on the shaft C through the intervention of the pitman-rod $j$ and arm $j'$, keyed upon the rock-shaft. All parts of the acting-faces of this lifter and this depressor move under this construction through the same distance. The straight-edge or rule-shaped piece of metal $h^3$ is secured to the arms which actuate the depressor $h^2$ on the inner sides of the levers, and serves to support these levers, preventing them from running away from the depressor.

The studded cylinder or pattern-barrel is keyed on a shaft, $k^3$, which has an arm, $k^4$, applied loosely on one end, carrying a pawl, $k^5$, which operates on a ratchet-wheel, $k^6$, on said shaft. The arm $k^4$ is connected by a rod, $k^7$, to an arm, $k^8$, on the rock-shaft $g'$, so that the studded cylinder is rotated intermittently by the oscillation of this shaft $g'$.

The operation of the whole contrivance is as follows: The studded cylinder, aided by gravity acting on the fingers and jacks, arranges the fingers, which arrange the jacks, some up, some down. Then the depressor catches those jacks which are up and the lifter those which are down, and as the lifter and depressor move in opposite directions they move the jacks, and consequently the levers, some in one direction, some in the other, thus lifting some heddles and depressing others to different distances, depending upon the position of the cords in the notches.

By observation of the drawings it will be perceived, as before stated, that the lifter and depressor are separate pieces of metal, and move simultaneously in opposite directions, and lie one above the other below the jacks, the jacks being between the lifter and the depressor; that the jacks lie in such manner that gravity shall cause them to rest upon the fingers and to fall when the studs of the pattern-barrel permit them to do so, and that the jacks have hooks or notches on their upper and lower sides, so that they must, in order to be operated, be located between the lifter and the depressor; that the fingers are so arranged that part of the weight of the jacks rests upon them and part of the weight both of jacks and fingers rests upon the studs of the pattern-barrel. In all these points the arrangement of the parts is material.

In the accompanying drawings, A is the frame of the loom; B, the vibrating lay, which latter receives motion from a crank-shaft, C, by means of pitman-rods C′.

On the extremities of the race-beam B′ guides *a a* are applied for receiving the shuttle-boxes $B^2$, which are secured to the upper ends of rods D, that receive an intermittent vertical motion for bringing the proper shuttles into action.

In the drawings I have represented only those parts of the loom which will illustrate the application of my invention. Those parts which are not represented may be constructed in the usual well-known manner.

The lower end of the rod D passes freely through an eye which is made through an arm, *a′*, on the oscillating pivot-bearing of the lay B, which, with the upper guides, *a a*, keep the rod and its boxes or shuttle-cells in proper position, and allow them to be elevated and depressed.

A yoke, *b*, is applied loosely to the rod D, and between the eyes of this yoke a collar, *b′*, is secured fast to said rod, to which collar an arm having a forked hook, $b^2$, on its upper end is pivoted.

Upon the upper end of the loose yoke *b* rests a helical spring, $b^3$, and upon the upper end of this spring is a collar, $b^4$, to which is pivoted a latch-piece, $b^5$, adapted for receiving the ends of the forked hook $b^2$, as clearly shown in Fig. 6.

To the outer end of the jointed piece $b^5$ a rod which is formed on a collar, $b^6$, is pivoted. This collar $b^6$ is of such diameter as to allow the spring $b^3$ on rod D to play freely through it.

The yoke *b* is connected by a short pitman-rod, *c*, to a lifting-arm, E, a pin, *c′*, on which rests upon the inclined stepped face of the reciprocating rod E′. (Shown in Figs. 1 and 6.)

It will be seen by reference to Fig. 6 that when the hook $b^2$ is in its place upon the latch-piece $b^5$ the rod D will be connected to the pitman-rod *c*, so as to be elevated and depressed by the vibrations given to the arm E. Should the shuttle-boxes $B^2$ meet with undue resistance in the upward movement of the rod D, the upward pressure and movement of the yoke *b* upon this rod will cause the jointed piece $b^5$ to throw off the hook $b^2$, and thus allow the yoke *b* to rise upon its rod without lifting the boxes or cells. Unless these boxes are obstructed the hook $b^2$ will not be thrown off the latch-piece.

The shuttle-boxes $B^2$ are moved up and down by the intermittent reciprocating movements given to the stepped inclined plane $E^2$ on the front end of the reciprocating rod E′, which is pivoted at its rear end to the lower end of a vibrating lever, F, on the horizontal rock-shaft F′, and supported and guided at its front end by a stirrup, $c^2$, which is made fast to the frame of the loom. When the rod E′ is moved forward its inclined plane $E^2$ will raise the arm E, which, in turn, will raise the rod D and shuttle-boxes $B^2$ a certain distance, according to the amount of forward movement given to said rod E′ by the lever F. This vibrating lever F is secured fast upon shaft F′, and has a number of hooked arms, *d*, pivoted to it at points above and below its axis of motion, the forward ends of which rods lie side by side upon a stirrup, *d′*, which is fast upon the loom-frame. The hooks on these arms *d* are upon their upper edges, near their front ends, and are arranged at different points on different levers. The arms *d* are connected by means of small rods $d^2$ to the ends of pivoted arms *e*, which rest upon the highest point of a studded cylinder, G, having its bearing upon a horizontal shaft projecting from a standard, G′. The weight of the arms *d* keeps the arms *e* down upon the surface of the studded cylinder G, the studs on which are arranged according to the pattern which it is desired to weave, so that as this cylinder is revolved the studs upon its circumference will be brought beneath the arms *e* at proper times, and cause them to lift the hooked arms *d*, so as to bring one of these latter arms at a time in such position as to be acted upon by a vibrating pawl, $G^2$. The pawl $G^2$ is pivoted on the side of the loom-frame, so that its lower end will lie in front of the hooks upon arms *d* in a position to act upon the hook of any one of these arms which is raised, as above described. The width of pawl $G^2$ is equal to the width of the hooked arms *d* collectively, and this pawl is vibrated by toes or cams *f* on shaft $G^3$, and also by the spring *f′*—that is to say, the cams move the pawl backward and the spring moves it forward and keeps it in contact with the cams.

The horizontal transverse shaft $G^3$ has a large spur-wheel (indicated in Fig. 1) upon it, which engages with a spur-wheel (also indicated in Fig. 1) on the crank-shaft C, which latter shaft carries a hub, $f^2$, having a cam-groove in its circumference, as shown in Fig. 3. This cam-groove communicates a backward intermittent rotary movement to the studded cylinder G through the medium of a curved lever, *g*, on a vertical rock-shaft, *g′*, a connecting-rod, $g^2$, loose arm $g^3$, and pawl $g^4$, (shown in Figs. 1, 2, 3, and 5.)

Those hooked arms *d* which are pivoted to the lever F nearest its axis of motion will, when pressed backward by the pawl $G^2$, elevate or depress the shuttle-boxes the greatest distance, and those arms which are pivoted to said lever farthest from its axis will, at each backward thrust, elevate or depress the shuttle-boxes the shortest distance. The backward movements of those levers *d* which are above the axis of lever F will elevate the shuttle-boxes, and a corresponding movement of the levers or arms *d* which are pivoted to lever F below its axis will depress the shuttle-boxes $B^2$.

It should be understood that the shaft F′ of lever F extends across the loom-frame, and has mechanism applied to it, corresponding to that above described, for operating the shuttle-boxes on the opposite end of the race-beam, so that when one set of boxes on one end of said beam is raised the opposite set will be depressed. The drawings show only one set or row of shuttle-boxes.

Having described my invention, what I claim as new, and desire to secure by Letters Patent, is—

1. The combination, with a series of shuttle-boxes, of the shuttle-box rod and its lifting mechanism, the hook attached to said rod, and the releasing-catch with its spring and connections, substantially as described, whereby the shuttle-boxes are lifted by a positive connection, which is disconnected whenever the shuttle or the boxes meet with obstruction to their upward movement to save breakage.

2. The combination of the pawl $G^2$ and its actuating mechanism, a series of hooked jacks, the double lever, the stepped cam, and means to connect the said cam and the double lever with a tier of shuttle-boxes, devices to connect the stepped cam and the tier of shuttle-boxes, and pattern mechanism to bring the jacks into position to be operated by the pawl, substantially as described.

3. The combination, substantially as described, of these elements: first, a series of heddle-levers; second, a series of jacks having the portions thereof to be engaged by the lifter and depressor located at the same side of the levers; third, a separate and independent lifter; fourth, a separate and independent depressor; fifth, selecting devices; sixth, mechanism for actuating the lifter, depressor, and selecting devices; seventh, a series of fingers, the lifter and depressor being arranged one above and the other below the jacks, which lie between them at the same side of the levers, the entire part of the jack to be engaged by the lifter and depressor being made available to cause the jacks and fingers to descend quickly and remain down when not lifted by the pattern-barrel, substantially as set forth.

4. The combination of a series of levers provided with notches at their extremities with a series of jacks having the portions thereof to be engaged by the lifter and depressor located at the same side of the levers, a lifter, a depressor, a series of fingers, a pattern-barrel, and mechanism for operating said parts, the lifter and depressor being formed of separate pieces and arranged to embrace the jacks, and the latter and the fingers being adapted to descend by force of gravity when permitted by the pattern-barrel, the several parts operating to lift and depress the heddles to various heights while the acting-faces of both the lifter and depressor move through the same distance, substantially as described.

JOHN C. DUCKWORTH.

Witnesses:
W. C. TOMPKINS,
W. M. TIBBETTS.